Dec. 21, 1948.  E. L. HARDER  2,456,938
REGULATING SYSTEM
Filed Dec. 7, 1946

WITNESSES:
E. A. M. Closkey.
Nw. L. Groome

INVENTOR
Edwin L. Harder.
BY
Ezra W. Savage
ATTORNEY

Patented Dec. 21, 1948

2,456,938

UNITED STATES PATENT OFFICE 2,456,938

REGULATING SYSTEM

Edwin L. Harder, Pittsburgh, Pa., assignor to Westinghouse Electric Corporation, East Pittsburgh, Pa., a corporation of Pennsylvania Application December 7, 1946, Serial No. 714,823

3 Claims. (Cl. 322—28)

This invention relates to electrical systems and, in particular, to voltage-regulating systems.

An object of this invention is to provide a sensitive voltage-regulating system which is substantially unaffected by physical shock.

Another object of this invention is to provide a voltage-regulating system sensitive to small variations and capable of amplifying such small variations to provide a source of regulating power.

A more specific object of this invention is to provide a regulating system having a static power amplifier of the reactor type capable of amplifying small increments to provide energy for effecting a regulating action.

Figure 1:
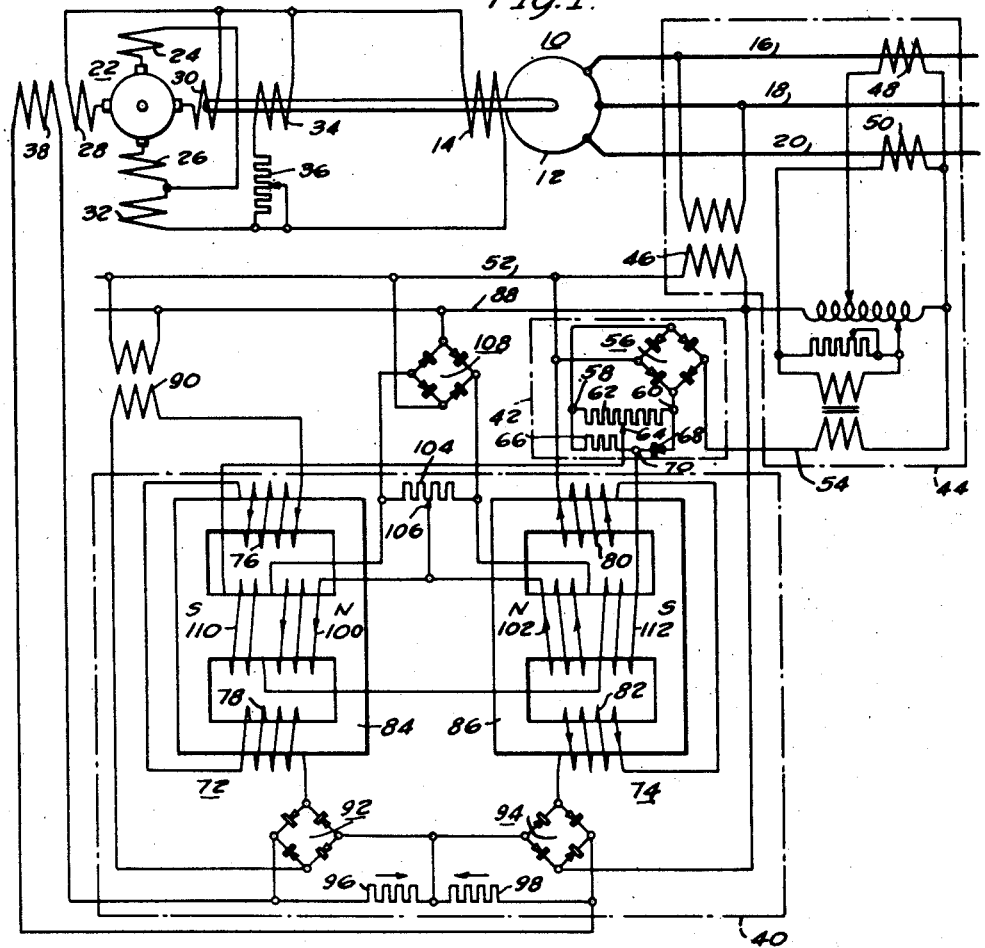
Figure 2:
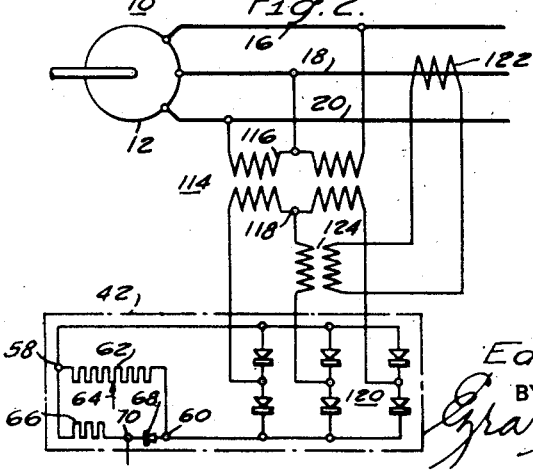

Other objects of this invention will become apparent from the following description when taken in conjunction with the accompanying drawing, in which:

Figure 1 is a diagrammatic representation of apparatus and circuits embodying the teachings of this invention, and, Fig. 2 is a diagrammatic representation of another embodiment of a part of the system of Figure 1.

Referring to the drawing, there is illustrated a generator 10 the voltage of which is to be regulated. The generator 10 comprises the armature windings 12 and the field windings 14, the armature windings 12 being connected for supplying a three-phase load circuit represented by conductors 16, 18 and 20. The field windings 14 are connected to be supplied from a rotary direct-current generator or self-excited exciter 22.

The self-excited exciter 22 schematically represented is of 4-pole construction having a plurality of field windings and is of the general construction and type disclosed and claimed in the copending application Serial No. 607,440, filed July 27, 1945, in the name of W. R. Harding and A. W. Kimball, and assigned to the assignee of this invention. As disclosed therein, the exciter or rotary direct-current generator 22 has a number of pole pieces and an equal number of commutator brushes arranged to assume sequentially positive and negative electrical potentials. In the embodiment schematically shown in the drawing, the positive brushes of the 4-pole machine are interconnected by an equalizing connection as are also the negative brushes of the machine.

The exciter generator 22 is provided with forcing fields 24 and 26 connected in series-circuit relation in one of the equalizing connections, the fields 24 and 26 being so divided as to constitute two groups of four windings each, a corresponding winding from each group being arranged on each of the four poles to be equally and sequentially excited by current flowing between the brushes. In addition to the forcing fields 24 and 26, the exciter generator 22 is also provided with compensating windings 28 and 30 disposed on two of the poles and self-sustaining or exciting field windings 32 and 34 which are so divided and positioned on all of the poles that the flux distribution of the self-excitation is symmetrical.

The field windings 32 are connected in series in the load circuit, whereas the field windings 34 are connected in shunt across the load circuit for the exciter generator 22, a calibrating resistor 36 being connected in series with the shunt field. The series and shunt field windings of the exciter generator 22 may be cumulative with the series field windings 32 providing slightly less than required sustaining field strength and the shunt field 34 being only strong enough for adjusting to full self-excitation field strength to compensate for manufacturing differences and installation adjustment or the like. On the other hand, the shunt field windings 34 may be wound to oppose the series field windings 32 where the windings 32 supply slightly more than required sustaining field strength.

The series tuned exciter generator 22 is also provided with a control field winding 38 so wound as to provide equal windings on two of the poles to increase the strength of one while decreasing the strength of the other when energized to distort the flux distribution in the field structure in a degree depending upon the energization of the control field winding. By utilizing the control field winding 38 in the exciter generator 22, the plurality of field windings cooperate in the single machine. as disclosed in the Harding et al. application Serial No. 607,440, identified hereinbefore, to give an extremely sensitive and quick response of generated voltage to changes of a comparatively weak input voltage while at the same time giving a high amplification ratio.

The control field winding 38 is disposed to be normally deenergized when the generator 10 is operating to maintain a predetermined line-voltage and to be directionally energized as the line-voltage increases or decreases from the predetermined value as described hereinafter to so control the exciter generator 22 as to correct the excitation of the generator 10 to correct for such departure and maintain the line-voltage substantially at the predetermined value.

As illustrated, the control field winding 38 is connected through a saturable core reactor amplifier network 40 connected through a measuring circuit network 42 to be supplied by the line-voltage, a network 44 being utilized to derive a positive-sequence component of the line-voltage for supplying a measure of the line-voltage to the network 42.

The network 44 for deriving the positive-sequence component of the line-voltage is disclosed and claimed in the copending application of E. L. Harder, Serial No. 560,299, filed October 25, 1944, now Patent 2,426,018, issued August 19, 1947. Briefly, the network 44 comprises the potential transformer 46 for deriving a single phase of the three-phase line-voltage having no zero-sequence voltage-component and current transformers 48 and 50 which cause line current to pass through the impedance in the network in such a manner as to produce a voltage drop substantially corresponding to the negative-sequence line-voltage, and the voltage drop thus resulting is subtracted from the single phase of the line-voltage to produce substantially the positive-sequence component of the line-voltage. Other embodiments of the positive-sequence component network 44 are disclosed and claimed in the application Serial No. 560,299 referred to hereinbefore, and may be employed instead of the specific network 44 illustrated in the embodiment shown in the drawing.

The output of the positive-sequence network 44 as measured across conductors 52 and 54 is connected to the input terminals of a dry-type rectifier 56 which supplies the measuring circuit of network 42. The measuring circuit illustrated as supplied from the output terminals of rectifier 56 comprises two parallel circuits connected between common taps or terminals 58 and 60. One of the parallel circuits comprises a resistor 62 having an intermediate adjustable tap 64, the other of the parallel circuits comprising a resistor 66 and a non-linear resistance such as a dry-type rectifier 68, for example, a copper-oxide rectifier, connected in series-circuit relation through an intermediate fixed tap 70. The tap 64 is disposed to be so adjusted that for any predetermined positive-sequence component of the line-voltage, the voltage drop across the section of resistor 62 between taps 60 and 64 equals the voltage drop across the rectifier 68 which is substantially a constant potential device whereby the potential drop across taps 64 and 70 is zero. As the positive-sequence component varies from the predetermined value, the potential drop across the section of resistor 62 between taps 60 and 64 changes and a potential drop appears across the taps 64 and 70 depending upon the direction and amount of the variation of the positive-sequence component from the predetermined value.

As the changes are small, in order to amplify such changes occurring across the output terminals of the measuring network 42, the output potential is utilized to control the amplifier network 40. In the embodiment illustrated, the amplifier consists of two substantially identical saturable core reactors 72 and 74 provided with alternating-current windings 76—78 and 80—82, respectively, disposed on the outer legs of their respective three-legged core members 84 and 86 and connected to be energized from an alternating-current source which, in this case, is represented by conductors 52 and 88 supplied from potential transformer 46. An isolating transformer 90 is connected in circuit between the source and windings 76—78 of reactor 72.

Each reactor 72 and 74 is provided with an associated rectifier 92 and 94, respectively, having such rectifiers connected in circuit with the alternating-current windings 76—78 and 80—82, respectively, the rectifiers being connected to supply associated resistor sections 96 and 98, respectively. As illustrated the resistor sections 96 and 98 are connected in series-circuit relation with one another but are so connected to their supply rectifiers as to be supplied with oppositely flowing currents.

In order that the reactors 72 and 74 will normally operate on the high amplification part of their characteristic curve, a fixed bias is applied by direct-current windings 100 and 102 disposed on the center legs of core members 84 and 86, respectively. One end of each winding 100 and 102 is connected to opposite ends of a potentiometer resistor 104, the other ends of windings 100 and 102 being connected through an adjustable tap 106 intermediate the ends of resistor 104. The resistor 104 is connected to be supplied with direct current from a rectifier 108 which is connected across the alternating-current supply represented by conductors 52 and 88. As illustrated the direct-current fixed biasing windings 100 and 102 are disposed in opposite relation to one another on their respective core members to, in effect, provide adjacent ends of the center legs of reactors 72 and 74 as north poles N and the opposite ends as south poles S. The tap 106 may be adjusted to effect an adjustment in the fixed bias applied by windings 100 and 102 to render the reactors electrically identical.

As stated hereinbefore, the potential drop appearing across taps 64 and 70 of the measuring circuit 42 is small depending upon the direction and amount of the variation of the positive-sequence component from the predetermined value. In order to control the saturation of the reactors 72 and 74 in response to such changes which are small compared to the fixed bias of windings 100 and 102, direct-current control windings 110 and 112 are disposed on the center legs of reactors 72 and 74, respectively. The windings 110 and 112 are connected in series-circuit relation with one another and are so disposed that one of the windings 110 and 112 aids its associated fixed biasing winding 100 or 102 and the other of the windings 110 or 112, as the case may be, opposes its associated fixed biasing winding 100 or 102. Thus, if the potential drop across taps 64 and 70 is zero, windings 110 and 112 have no effect on the saturation of the balanced reactors 72 and 74, whereas if a drop occurs, the saturation of one reactor is increased and the saturation of the other reactor is decreased depending upon the polarity of taps 64 and 70.

With such a balanced amplifier, if there is any change in the power source supplying the fixed bias, since the fixed bias supplied to each of the reactors is the same, then such change will not introduce a false signal in the output of the balanced reactors. The amplifier network 40 may therefore be used to amplify signal voltages from taps 64 and 70 which are small compared with fluctuations in the fixed bias power supply, the voltage drop across the series-connected resistors 96 and 98 constituting the power source for directionally energizing the control field winding 38 of exciter generator 22 in accordance with the variations of the positive-sequence component from the predetermined value.

In operation, assuming that the exciter generator 22 is normally self-excited sufficiently to maintain a given voltage output from the machine 10 and that tap 64 of the measuring network 42 is adjusted so that a voltage drop does not occur between taps 64 and 70 and that tap 106 is adjusted to control the fixed bias of reactors 72 and 74 and render them electrically identical, the system is in a condition of stable operation.

If the load supplied by generator 10 should change as, for example, to effect a decrease in the line voltage, then the positive-sequence component across conductors 52 and 54 and supplied to the rectifier 56 decreases with the result that the potential drop across the section of resistor 62 between taps 60 and 64 so changes with respect to the potential drop across the rectifier 68 that the potential at the adjustable tap 64 becomes less negative than the potential at tap 70. Under these conditions, current flows from the adjustable tap 64 through the direct-current control winding 110 of reactor 72 and the direct-current control winding 112 of reactor 74 back to tap 70 of the measuring network 42.

Under such circumstances, the winding 110 opposes the effect of the fixed biasing winding 100 to decrease the saturation of reactor 72 whereas winding 112 aids the effect of the fixed biasing winding 102 to increase the saturation of reactor 74. Thus, the current flowing through the rectifier 92 and consequently through resistor section 96 is decreased, whereas the current flowing through rectifier 94 and consequently resistor section 98 is increased to effect a net voltage drop across resistor sections 96 and 98 to cause current to flow through control field winding 38 in a direction whereby the excitation effect resulting aids the excitation effect of the series field windings 32 of exciter generator 22. This increase in the excitation of exciter generator 22 effects an increase in the excitation of generator 10 to increase the line-voltage and return it to the predetermined value which is to be maintained.

If the line-voltage and, consequently, the positive-sequence component across conductors 52 and 54 should increase above the predetermined value which is to be maintained, then the potential at tap 64 becomes more negative with respect to the potential at tap 70 and current flows from tap 70 through the direct-current control winding 112 and direct-current control winding 110 to the adjustable tap 64. Under these conditions, the winding 110 aids the effect of the fixed biasing winding 100 to increase the saturation of reactor 72 and the winding 112 opposes the effect of the fixed biasing winding 102 to decrease the saturation of reactor 74.

The change in the saturation of the normally balanced reactors 72 and 74 just described effects an increase in the current flow through resistor section 96 from rectifier 92 and a decrease in the current flow through resistor section 98 from rectifier 94 to effect a reversal in the net potential drop across the series-connected resistor sections 96 and 98. The resulting net potential drop causes current to flow through the control field winding 38 of exciter generator 22 in a direction to oppose the excitation effect of the series field windings 32 to decrease the output of the exciter generator 22. Such decrease effects a decrease in the excitation of generator 10 with the result that the line-voltage and, consequently, the positive-sequence component thereof decreases and approaches the predetermined value which is to be maintained.

In Figure 2 there is illustrated a simplified circuit for providing a direct current to the measuring circuit of the network 42 which is an average three-phase current and which is unaffected by frequency changes. In this embodiment, a three-phase potential transformer 114 is illustrated having its primary windings 116 connected to be supplied from conductors 16, 18 and 20, the secondary windings 118 being connected to supply a three-phase rectifier 120 connected to the taps 58 and 60 of the bridge measuring circuit. A current transformer 122 is disposed on conductor 18 to supply transformer 124 in circuit with the secondary windings 118 to provide droop compensation in a well known manner. The amplifier 40 functions efficiently when controlled in this manner as the average three-phase current is substantially as sensitive as variations in the positive-sequence component and can be obtained with a minimum of elements of standard construction.

The regulating system of this invention is efficient being fast in response and having little power loss in the measuring and amplifying networks utilized. The amplifying network is particularly efficient giving amplifications of power in the ratio as high as 10,000 to 1 where the fixed bias applied to the normally balanced reactors is such as to effect the operation of the reactors on the high amplification part of their characteristic curves. Further, the system is constructed of substantially standard components and can be readily duplicated.

I claim as my invention:

1. In a regulating system for maintaining a quantity of an alternating-current system substantially constant, in combination, an amplifying network disposed to be operated in accordance with variations of the quantity from a predetermined value, the network comprising a pair of saturable core amplifiers having alternating-current windings thereon connected to be supplied from a source of alternating current, a rectifier for each of the amplifiers connected to be supplied through the alternating-current windings of the associated saturable core amplifier, means for applying a fixed bias to each of the saturable core amplifiers to effect the operation thereof on the high amplification part of its characteristic curve, a direct-current control winding disposed on each of the saturable core amplifiers, means for providing a direct-current measure of the alternating-current quantity, a resistance bridge circuit including a non-linear resistance element connected to said direct-current measuring means for sensing the direction and magnitude of departure of the direct-current measure of the alternating-current quantity from a predetermined value and to provide a directional direct-current output therefrom dependent upon said direction and magnitude of departure, the direct-current control windings of the reactors being connected to be energized in accordance with the directional output of the bridge circuit, the direct-current control winding of each of the saturable core amplifiers being disposed thereon to cooperate with the associated fixed bias thereof to effect opposite changes in the saturation of the core amplifiers and thereby effect opposite changes in the output from the rectifiers associated therewith, and means connected in circuit relation with the rectifiers disposed to be energized in response to the output therefrom for regulating the quantity.

2. In a regulating system for maintaining a quantity of an alternating-current system substantially constant, in combination, an amplifying network disposed to be operated in accordance with variations of the quantity from a predetermined value, the network comprising a pair of saturable core amplifiers having alternating-current windings thereon connected to be supplied from a source of alternating current, a rectifier for each of the amplifiers connected to be supplied through the alternating-current windings of the associated saturable core amplifier, a resistor section connected across each of the rectifiers to be supplied therefrom, the resistor sections being connected in series-circuit relation with one another but disposed to be supplied with oppositely flowing currents from the associated rectifiers to provide equal but opposite potential drops across the resistor sections under predetermined operating conditions of the saturable core amplifiers, means for applying a fixed bias to each of the saturable core amplifiers to effect the operation thereof on the high amplification part of the characteristic curve, a direct-current control winding disposed on each of the saturable core amplifiers, means for providing a direct-current measure of the alternating-current quantity, a resistance bridge circuit including a non-linear resistance element connected to said direct-current measuring means for sensing the direction and magnitude of departure of the direct-current measure of the alternating-current quantity from a predetermined value and to provide a directional direct-current output therefrom dependent upon said direction and magnitude of departure, the direct-current control windings of the reactors being connected to be energized in accordance with the directional output of the bridge circuit, the direct-current control winding of each of the saturable core amplifiers being disposed thereon to cooperate with the associated fixed bias thereof to effect opposite changes in the saturation of the core amplifiers and thereby effect opposite changes in the currents flowing in the resistor sections to produce a directional potential drop across the resistor sections depending upon the direction of variation of the quantity from the predetermined value, and means connected across the series-connected resistor sections disposed to be directionally energized in response to the potential drop thereacross for regulating the quantity.

3. In a regulating system for maintaining an electrical quantity substantially constant, in combination, a positive-sequence network connected to provide a positive-sequence component of the electrical quantity, an amplifying network disposed to be operated in accordance with variations of the positive-sequence component from a predetermined value, the network comprising a pair of saturable core reactors having alternating-current windings thereon connected to be supplied from a source of alternating current, a rectifier associated with each of the reactors and connected to be supplied through the alternating-current windings thereof, a resistor section connected across each of the rectifiers to be supplied therefrom, the resistor sections being connected in series-circuit relation with one another but so connected to the rectifiers as to be supplied with oppositely flowing currents to provide equal but opposite potential drops thereacross under predetermined operating conditions of the reactors, means for applying a fixed bias to each of the saturable reactors to effect the operation thereof on the high amplification part of its characteristic curve, a direct-current control winding disposed on each of the saturable core reactors, the direct-current control windings being connected in series circuit with one another but being disposed on the respective reactors to aid the fixed bias of one and oppose the fixed bias of the other when energized to effect opposite changes in the saturation of the reactors, means for providing a direct-current measure of the positive-sequence component of the electrical quantity, a resistance bridge circuit including a non-linear resistance element for sensing the direction and magnitude of departure of the direct-current measure of the positive-sequence component from a predetermined value and to provide a directional direct-current output therefrom dependent upon said direction and magnitude of departure, the direct-current control windings of the reactors being connected to be energized in accordance with the directional output of the resistance bridge circuit, the control windings and the associated fixed bias thereby cooperating to control the currents flowing in the series-connected resistor sections to produce a directional potential drop thereacross, and means connected across the series-connected resistor sections disposed to be directionally energized in response to the potential drop thereacross for regulating the electrical quantity.

EDWIN L. HARDER.

REFERENCES CITED

The following references are of record in the file of this patent:

UNITED STATES PATENTS

| Number | Name | Date |
|---|---|---|
| 2,412,442 | Crever et al. | Dec. 10, 1946 |
| 2,414,936 | Edwards et al. | Jan. 28, 1947 |